United States Patent [19]

Duschl

[11] 4,454,545
[45] Jun. 12, 1984

[54] CHARGE COUPLED DEVICE BASED INSPECTION SYSTEM AND METHOD

[75] Inventor: Robert A. Duschl, Lancaster, Pa.

[73] Assignee: RCA Corporation, New York, N.Y.

[21] Appl. No.: 388,143

[22] Filed: Jun. 14, 1982

[51] Int. Cl.³ .............................................. H04N 3/15
[52] U.S. Cl. .................................... 358/213; 358/106
[58] Field of Search ................. 358/106, 107, 213, 10, 358/139

[56] References Cited

U.S. PATENT DOCUMENTS

| 3,781,574 | 12/1973 | White et al. | 307/304 |
| 4,276,609 | 6/1981 | Patel | 364/900 |
| 4,344,091 | 8/1982 | Gardner | 358/213 |
| 4,356,513 | 10/1982 | Yoshimura | 358/213 |
| 4,378,571 | 3/1983 | Handy | 358/213 |
| 4,399,464 | 8/1983 | Hix | 358/213 |

OTHER PUBLICATIONS

"CCD Trackers for High Accuracy Guidance Applications", by Phil M. Salomon of Jet Propulsion Laboratory.
"Charge-Coupled Devices Tackle TV Imaging", by A. P. King & M. Farrier in Electronic Design, pp. 183-190, Aug. 6, 1981.
A ten-page brochure by Photometrics Ltd. of Tucson, Arizona describes a Model CH81-A camera head and Model 80A Universal Camera Controller, published prior to Jun. 1981.

Primary Examiner—Howard W. Britton
Attorney, Agent, or Firm—Eugene M. Whitacre; Dennis H. Irlbeck; Lester L. Hallacher

[57] ABSTRACT

An inspection system utilizing a CCD includes a CCD data transfer generator which allows the changing of the CCD without redesigning the system. The numbers of horizontal rows and vertical columns of pixels of the CCD are set into a digital memory and into a waveform generator. The waveform generator provides horizontal scanning and vertical scanning waveforms in accordance with the row and column settings whereby the CCD can be replaced with a different size CCD and new numbers set into the memory and waveform generator.

11 Claims, 19 Drawing Figures

CHARGE COUPLED DEVICE BASED INSPECTION SYSTEM AND METHOD

BACKGROUND OF THE INVENTION

This invention relates generally to systems employing a charge coupled device (CCD) and particularly to a CCD system including a scanning or data transfer generator and method wherein the CCD is replaceable with a CCD having a different number of picture elements or pixels.

Charge coupled devices are finding use in a wide range of equipment requiring image sensing. For example, CCD image sensors can be used to replace the standard vidicon image pickup tubes which ordinarily are used in television cameras. An article, entitled "Charge-Coupled Devices Tackle TV Imaging," by Allan P. King and Michael Farrier which appeared in *Electronic Design* Aug. 6, 1981, Pages 183 through 190 explains how CCDs can be used in television cameras. The Model 80A Camera Controller and Model CH81A Camera Head available from Photometrics Ltd. of Tuscon, Ariz. also are examples of presently available equipment utilizing CCDs.

CCDs are used in conjunction with an optical lensing system which focuses the light from the object being investigated onto the CCD. Varying amounts of light on the individual pixels within the CCD cause electron generation within the pixels. The electron generation causes each pixel to develope a charge packet proportional to the incident light. The optical information from the object is, therefore, available in analog form across the pixels of the CCD array. The charge packets are then shifted out of the CCD and converted into digital form and stored in a digital memory where the various characteristics of the object can be checked or tested by the proper manipulation of the digital information.

CCDs are small, rugged devices having spacially precise sensing elements and, therefore, are advantageous for use in precise measuring systems. CCDs also are advantageous in imaging devices which develope an image by scanning. A CCD receives an image by the direct reception of light without the CCD being scanned. Accordingly, a CCD can image a scanned device without concern for the scanning rate of the device being imaged. For these reasons, CCDs are useful in testing color television kinescopes for blemishes and covergence and also for the inspection of geometric figures where high precision is required. The individual pixels within a CCD array typically are arranged horizontally in rows and vertically in columns whereby a given CCD imaging device provides a fixed number of pixels of information. As an example, the SID52501 CCD presently available from RCA has 320 vertical columns of pixels and 512 horizontal rows of pixels. Accordingly, the information is read out from the CCD and stored in 320 vertical columns and 512 horizontal rows of a digital memory. The technology of fabricating CCDs is rapidly expanding and CCDs having higher numbers of pixels are rapidly becoming available. With the present state of the art, the incorporation of a larger (or smaller) CCD into a particular system necessitates the redesign of the system because of the manner in which the analog data are read out from the CCD. Additionally, CCDs which are sensitive to a particular wavelength of energy, such as infrared, also are becoming available. A CCD sensitive to infrared energy typically requires transfer waveforms which are different from those required for a light sensitive CCD. It, therefore, would be highly advantageous to have a system which can receive a CCD having any number of horizontal rows and vertical columns of pixels, or which is responsive to a particular wavelength of light, without completely redesigning the system.

The instant invention fulfills these requirements by the provision of a CCD inspection system having a data transfer generator and a waveform memory wherein a CCD having any number of columns and rows of pixels can be insrted into the system by merely setting new horizontal and vertical scan numbers and new scanning waveforms into the system.

CROSS REFERENCE TO RELATED APPLICATIONS

Application Ser. No. (388,038) entitled "Charge Coupled Device Based Blemish Detection System And Method": filed of even date herewith by R. A. Duschl describes a system which can be used with the claimed invention.

Application Ser. No. (388,029) entitled "Charge Coupled Device Based System And Method For Measuring Projected Figures" filed of even date herewith by R. A. Duschl describes a system which can be utilized utilized with the claimed invention.

Application Ser. No. (388,037) entitled "Charge Coupled Device Based System And Method For Inspecting And Modifying Images" filed of even date herewith by R. A. Duschl describes a system which can be utilized with the instant invention.

SUMMARY OF THE INVENTION

A CCD inspection system includes a data transfer generator for transferring data from a CCD to a digital storage device which permits replacing the CCD with a CCD having a different number of pixels without redesigning the other components of the system. A memory stores the number of horizontal rows of pixels and the number of vertical columns of pixels of the CCD. The system includes first and second means for selectively setting the number of rows of pixels and the number of columns of pixels into the memory. A waveform generator provides the waveforms needed to transfer data from the CCD to the storage device in accordance with the numbers of rows and columns and transfer characteristics of the CCD whereby CCDs of different sizes or transfer characteristics can be used in the system by changing the settings on the first and second means or by changing the contents of the waveform generator.

DETAILED DESCRIPTION OF THE PREFERRED EMBODIMENT

Figure 1:
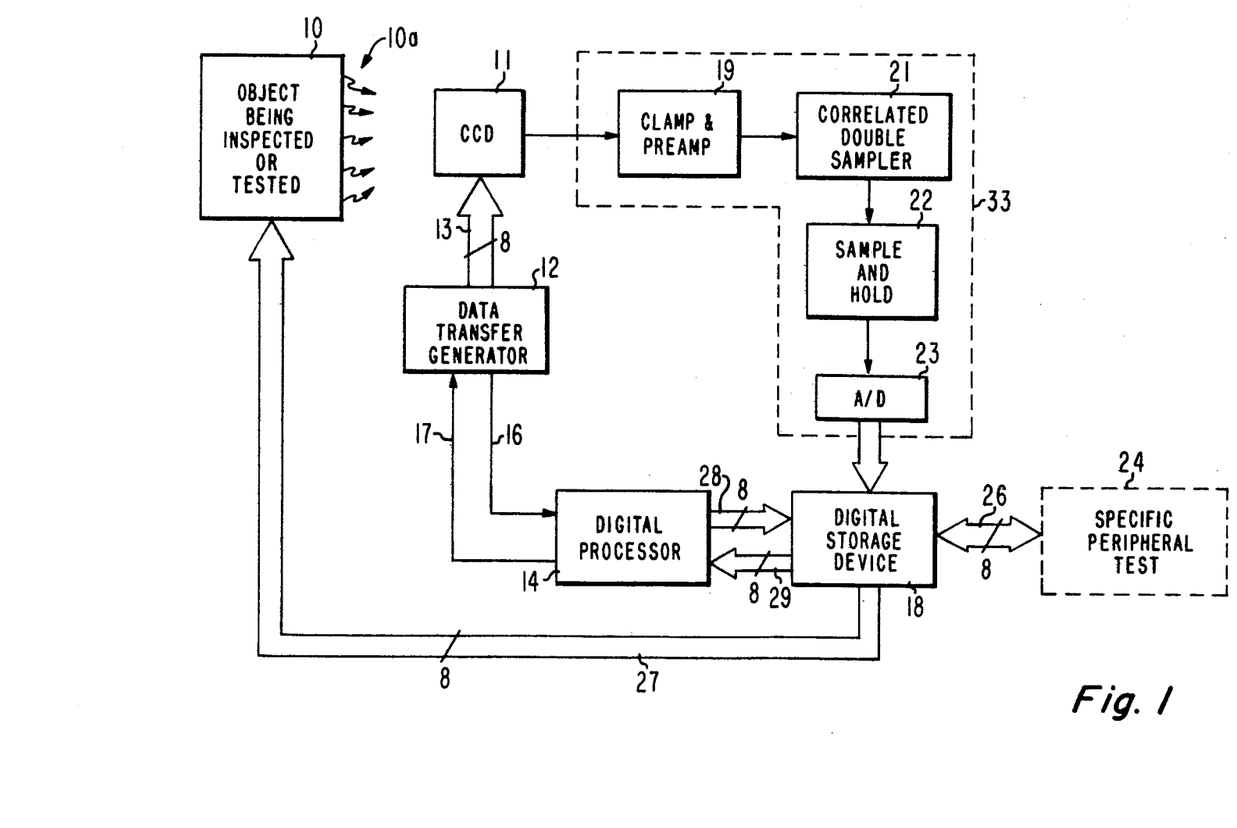
FIG. 1 is a CCD inspection system incorporating a data transfer generator in accordance with the instant invention.

FIG. 1 shows a system including a charged coupled device (CCD) 11 for inspecting or testing an object 10. The object being inspected can be a kinescope for a color television receiver and the inspection being performed can be the measurement of the convergence of the electron beams. The system can also be used for any of the purposes described in the patent applications referred to hereinabove. The light rays 10a eminating from the object 10 impinge upon the CCD 11 and each pixel of the CCD is charged proportionately to the amount of light energy received. A data transfer generator 12 is coupled to the CCD 11 by output lines 13. The data transfer generator 12 transfers the analog information from the CCD to a digital storage device 18. The digital storage device 18 can be any type of memory device having sufficient memory capacity to store the data from the CCD. For example, a Model 3400 Image Processor available from Lexidata Corporation can be used. The transfer of the data from the CCD to the storage device 18 is effected through a clamp and preamp 19, a correlated double sampler 21, a sample and hold circuit 22 and an analog to digital converter 23, all of which are known in the art of transferring analog information from a CCD to a digital storage device, as evidenced by the Electronis Design article referenced hereinabove and U.S. Pat. No. 3,781,574.

The data transfer generator 12 and a digital processor 14 communicate through connecting lines 16 and 17. Also, the digital processor 14 communicates with the digital storage device 18 through the connections 28 and 29. The digital processor 14 can be a PROM, EPROM or RAM depending upon the flexibility and speed required for the particular inspection being performed. The digital storage device 18 also is coupled to the object being tested 10 by lines 27. The digital processor 14 also is associated with a specific peripheral test apparatus 24 by which any of several tests can be performed, such as any of those identified in the Cross Referenced Patent Applications Ser. Nos. 388,029, 388,037 and 388,038 fully identified hereinabove. The specific peripheral test apparatus 24 can be a programmed test set into the processor 14 when the processor is reduced to practice using software and has sufficient memory capacity. Alternatively, the specific test apparatus 14 can be a PROM, EPROM or hardwired to cooperate with the processor 14.

In operation the CCD 11 is exposed to the light rays 10a from the object being tested 10 and each pixel within the CCD array is charged proportionately to the amount of light in impinging upon that particular pixel. The CCD acts as an analog storage device for the information received from the object being tested. The analog data available on the CCD are read out to the digital storage device 18 in a manner shown in FIG. 4. The charged pixels in an image area 31 of the CCD are arranged in horizontal rows and vertical columns. To transfer the stored data to the digital storage device 18, all the horizontal rows of data are simultaneously shifted upwardly in parallel fashion and the first horizontal row is shifted into a horizontal register 32. The individual pixel data packets are then serially shifted from the register 32 through the output circuitry 33 to the digital storage device 18. After the first horizontal row of data is read out, the horizontal register 32 is empty and all the remaining rows are vertically shifted upwardly to shift the next horizontal row into the horizontal register 32. This row is then serially output to the digital storage device 18. This operation continues until all the horizontal rows of data are stored in the digital storage device 18.

Figure 2:
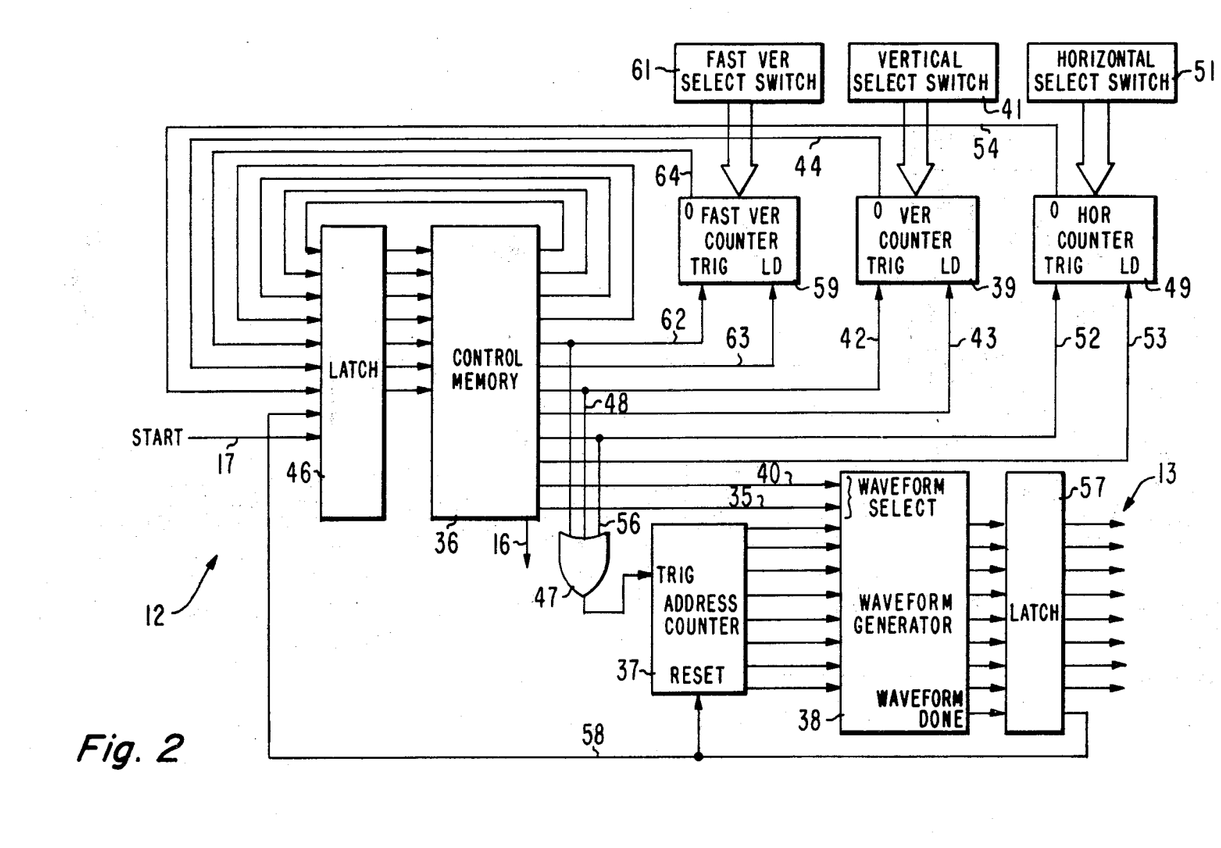
FIG. 2 is a data transfer generator in accordance with the instant invention and which can be used in the system of FIG. 1.

A CCD has a fixed number of pixels. Accordingly, all the circuitry such as the data transfer generator and the waveform generator which cooperate to effect the transfer of the data from the CCD to the digital storage device are designed for a specific CCD. For this reason, changing the CCD to a CCD having a different number of pixels or which is sensitive to a different type of energy typically requires redesigning all the associated circuitry. A preferred embodiment of a data transfer generator 12 which permits replacing the original CCD with a CCD having either more or less pixels, or which requires different transfer waveforms without replacing the other circuitry and components of the system is shown in FIG. 2. The data transfer generator 12 includes a control memory 36, an address counter 37 and a programmable waveform generator 38. The control memory 36 and the waveform generator 38 are programmable devices and thus can be PROM's, EPROM's or RAM's, depending upon the flexibility and speed required. Thus, for example, the control memory 36 can be an EPROM configured as a state machine and programmed in accordance with FIG. 3. The control memory 36 controls the selection of the vertical and horizontal waveforms which transfer the data from the CCD to the storage device 18. The waveform generator 38 is a digital memory which stores the vertical and horizontal transfer waveforms as programmable sets of digital one's and zeros. Thus, the control memory 36 controls whether vertical or horizontal shifting occurs and selects the waveform consistent with the required shift. The waveform generator then shifts the data in accordance with the selection of the control memory 36. The operation of the control memory 36 and the waveform generator 38 are explained more fully hereinafter with respect to FIGS. 3, 5 and 6.

A vertical counter 39 is associated with a vertical select switch 41 which is used to set the counter 39 to a particular count. Thus, when a CCD having 512 horizontal rows of pixels is utilized, 512 vertical shifts of the stored data are required and the vertical counter is set to 512. The counter 39 is a down counter and the set count therefore is decreased by one each time one vertical data transfer is requested by the control memory 36. The trigger input terminal of the vertical counter 39 receives an input from the control memory 36 by way of the line 42. Similarly, the load input terminal of the counter 39 receives an input from the control memory 36 by way of the line 43. The count output of the counter 39 provides an input to the control memory 36 by way of the line 44 and a latch circuit 46. This input normally is low and goes high when the counter has counted down to zero to set the latch 46 and signify the end of the set count. The control memory 36 triggers the counter 39 and the counter counts down one count to indicate that one vertical shift of the horizontal rows of data has been effected, in a manner fully described hereinafter with respect to FIG. 3. When a CCD having a different number of horizontal rows of pixels is to be used in the system, the vertical select switch 41 is used to set the counter 39 to the number of pixel rows on the replacement CCD. After this setting is made a start pulse from the digital processor 14 (FIG. 1) to the latch circuit 46 over line 17 changes the state of the latch 46. The control memory 36 triggers the counter 39 and one vertical transfer of data from the replacement CCD can be made.

The control memory 36 also has two output lines 35 and 40 to provide waveform select inputs to the waveform generator 38. Thus, when vertical data transfer is required, the memory 36 provides a signal on line 35 to select the vertical waveform which is stored in the waveform generator 38. When horizontal data transfer is required, line 40 is actuated to select the horizontal waveform.

The output line 42 of the control memory 36 is also coupled to an address counter 37 through an OR Gate 47 and a line 48. Thus, after the vertical waveform is selected, a trigger pulse on the line 42 triggers both the address counter 37 and the vertical counter 39 and one vertical shift of the CCD data is effected. The waveform generator 38 is a digital storage device containing a store of one's and zeros for both vertical and horizontal data transfer. The address counter 37 sequences the waveform generator and the output of the latch 57 remains high until the last ONE is output and the "DONE" output goes low to reset the latch 57. The change in state of the latch 57 resets the address counter 37 and the latch 46 by way of a line 58. Accordingly, when the CCD 11 is replaced, the waveforms needed for the replacement CCD can be provided merely by reprogramming the data stored in the waveform generator 38.

Figure 4:
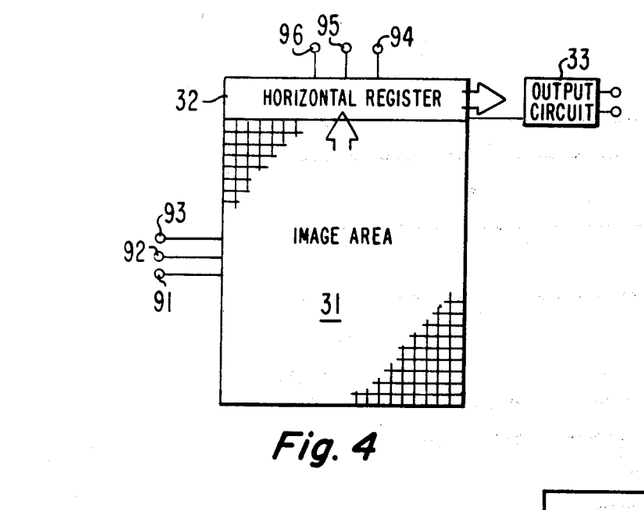
FIG. 4 is a schematic diagram showing how the data are transferred from the CCD to the digital storage device.

A horizontal counter 49 is associated with a horizontal select switch 51 which is used to set the number of steps required to serially transfer the data from the horizontal register 32 of FIG. 4 through the output circuitry 33 to the digital storage device 18. Thus, when a CCD having 320 vertical columns of pixels, for example, is utilized, 320 horizontal steps are required and the horizontal select switch 51 is set to 320. The horizontal counter 49 is triggered and loaded by the control memory 36 by way of the lines 52 and 53 respectively, and the output of the counter 49 is coupled to the latch circuit 46 by the line 54. The trigger line 52 also is coupled to the address counter 37 by a line 56 and the OR Gate 47. Thus, after the horizontal waveform is selected, a trigger pulse on line 52 triggers both the address counter 37 and the horizontal counter 49 and one horizontal shift of data from the CCD to the storage device 18 is effected.

The output of the waveform generator 38 is applied to the CCD 11 through the latch circuit 57 and the output leads 13. A reset pulse is applied by way of the output line 58 of the latch 57 to the address counter 37 and to the control memory 36 through the latch 46. Thus, each individual vertical or horizontal data shift results in the resetting of the control memory 36 and the address counter 37. After being reset, the control memory 36 selects the vertical or horizontal waveform and another shift of the CCD data is effected.

A fast vertical counter 59 is associated with a fast vertical select switch 61 and receives a trigger input from the control memory 36 by way of a line 62 and a load input by way of a line 63. The count outputs from the fast vertical counter 59 are provided to the control memory 36 through the latch circuit 46 by way of an output line 64. The fast vertical counter 59 is utilized when the CCD 11 is used for the dual purposes of storing data and imaging data. In FIG. 4, the upper half of the CCD image area 31 can be shielded from the light rays 10a (FIG. 1) by a mechanical shield or other technique so that light from the object 10 being inspected does not inpinge upon this section of the CCD. The bottom half of the CCD receives light from the object being inspected and this area serves as the imaging area of the CCD. After the imaging area of the CCD is exposed, the fast vertical counter 59 is actuated and the data are rapidly shifted upwardly to the storage area. This upward shifting of the data occurs much more rapidy then when data are being transferred to the ouptut circuitry 33 because the horizontal shifting of the data out of the horizontal register 32 does not take place at this time. After all the rows of data are shifted to the storage area the imaging area is ready to receive new information from the object 10 while the data in the storage area are transferred to the storage device 18. After the data stored in the storage area are transferred through the output circuitry 33 to the digital storage device 18, the new information can be shifted to the storage area. When the CCD is not used for both storage and imaging, the fast vertical oounter 59 is set to zero.

Figure 3:
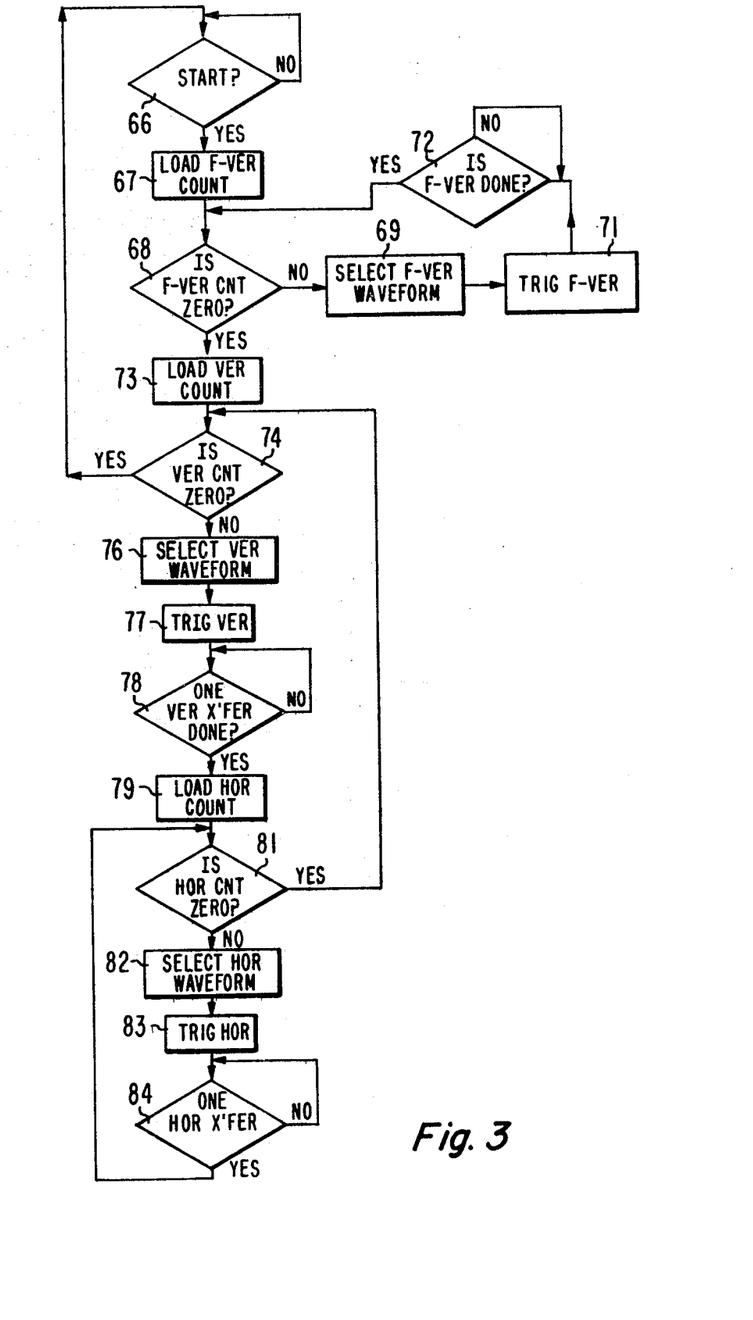
FIG. 3 is a flow chart showing the operation of the control memory used in the CCD inspection system of FIG. 1.

FIG. 3 is a functional diagram of the data transfer generator 12 of FIG. 1 and is applicable when the generator is reduced to practice utilizing hardware, software or firmware. When a start pulse is received on line 17, the start block 66 is initiated and at functional block 67, the fast vertical count is loaded from the fast vertical switch 61 (FIG. 2) into the fast vertical counter 59. Functional block 68 is next entered and when the CCD is used for both imaging and data storage, the fast vertical counter is set to the count required to shift the data to the storage area and the waveform set into the waveform generator 38 for vertical data transfer is entered into at functional block 69. At functional block 71, a fast vertical trigger input is applied to the trigger input of the counter 59 and to the waveform generator 38 through the address counter 37. One vertical shift of data is thus completed by the waveform generator 38. This operation continues until the fast vertical count is reduced to zero as indicated at functional block 68. In FIG. 2, when the count of the counter 59 is zero, the output line 64 goes high to change latch 46 and indicate the end of the fast vertical count. The fast vertical transfer of data transfers data from the imaging area of the CCD to the storage area. The vertical transfer is rapid because horizontal shifting of the data to the output circuitry is not required. After the rapid vertical transfer is complete, the vertical count indication at functional block 68 is zero, and the CCD can be used to receive new data from the object being inspected. When the CCD is not used for both storage and imaging the counter 59 is set to zero and steps 69, 71 and 72 are bypassed by the system.

The number of vertical shifts required is loaded from the vertical switch 41 into the vertical counter 39 at functional block 73. At functional block 74, the vertical count is not zero and the waveform for the vertical shifting of the data which is set into the waveform generator 38 (FIG. 2) is selected at functional block 76. The control memory 36 and the OR Gate 47 respectively, trigger the vertical counter 39 (by way of the lead 42) and the waveform generator 38 at functional block 77.

When one vertical transfer of data is finished, as indicated at functional block 78, the first horizontal row of pixel information has been transferred to the horizontal register 32 of FIG. 4. The system is then readied to enter into the horizontal data transfer mode to to serially transfer the data from the register 32 to the output circuitry 33 and the digital storage device 18.

As indicated at functional block 79 of FIG. 3, the number of horizontal counts required is loaded by the horizontal switch 51 into the counter 49. When the horizontal count is not zero at functional block 81, the select horizontal waveform functional block 72 is entered and the horizontal data transfer waveform set into the waveform generator 38 is selected. The counter 49 and the waveform generator are then triggered by an input on line 52, and the OR Gate 47, respectively, as indicated at functional block 83. After one horizontal shift of data from the register 32 (FIG. 4) the system returns to function block 81 and another horizontal transfer of data is effected. This operation continues until all data in the horizontal register 32 are transferred to the storage device 18. Thus, for a CCD having 320 vertical columns of pixels, 320 horizontal data shifts are effected. When the register 32 is empty, a yes indication is obtained at functional block 81 and the system returns to functional block 74 to effect the next vertical transfer of data. The vertical count is then incremented and the image data on the CCD are shifted upwardly one row placing the next horizontal row of pixel information available on the CCD into the horizontal register 32. The alternate vertical and horizontal shifting of data continues until all the data available in the image area 31 of the CCD have been placed into the digital storage device 18 and the CCD is again ready for exposure to light from the object being inspected.

Figures 5A, 5B, 5C, 5D:
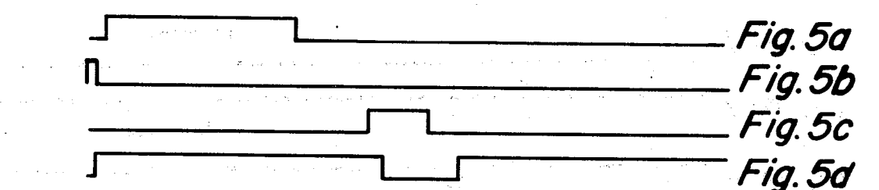
FIGS. 5a, 5b, 5c, 5d, 5e and 5f show the waveforms used in vertically transferring data from the CCD to the storage device.
Figures 5E, 5F:
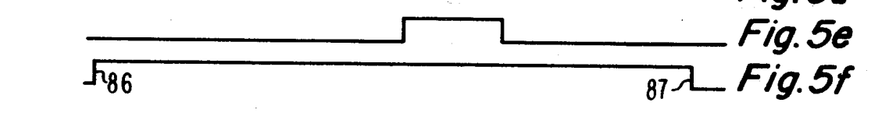

FIGS. 5a to 5f are examplary waveforms which can be provided by the waveform generator 38 (FIG. 2) when the data are being vertically shifted. The waveform generator, is a digital memory and, therefore, the waveforms can be changed by changing the digital information set into the memory. CCDs are ac coupled devices, accordingly, the pulse of FIG. 5a is used to clamp the level of the output received from the CCD. As is known to those skilled in the art, most CCDs include a small output capacitor. The pulse of FIG. 5b are used to set this output capacitor to a fixed potential each time the CCD data are transferred to the digital memory 18. The waveforms of FIGS. 5c, 5d and 5e are the vertical clocking waveforms. As is known to those skilled in the CCD art, three clocking waveforms are required to vertically shift data on some types of CCDs. The waveforms of FIGS. 5c, 5d and 5e thus are input to the CCD on the input terminals 91, 92 and 93 of FIG. 4. Other types of CCDs require other numbers of waveforms to effect the transfer of data. With the invention, the number and duration of the waveforms can be changed by changing the digital data stored in the digital waveform generator 38.

The waveform of FIG. 5f is the start-stop waveform for vertical data transfer. Thus when the rise side 86 of this waveform is applied to the latch 57 of FIG. 2, the latch changes state and data transfer can begin. Also, the change in the latch 57 causes the line 58 to actuate the latch 46 and the control memory 36 can commence operation. Thus, the rise 86 initiates operation of the functional block 78 of FIG. 3. The fall side 87 of the FIG. 5f waveform resets the latches 57 and 46 giving the Yes indication at functional block 78 of FIG. 3 and one vertical transfer of data is completed. The width of the FIG. 5f waveform, therefore, can be changed to accommodate for the change in transfer time which would occur when the CCD is replaced with a different CCD.

Figure 6A:
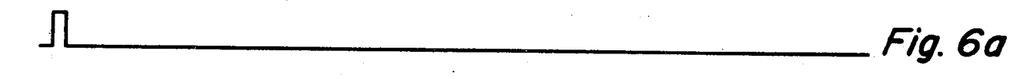
FIGS. 6a, 6b, 6c, 6d, 6e, 6f, 6g, 6h and 6i show the waveforms used in horizontally transferring data from the CCD to the storage device.
Figure 6B:
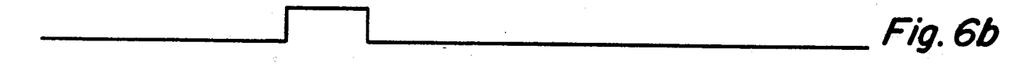
Figure 6C:
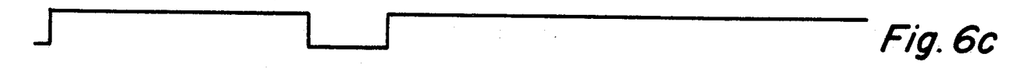
Figure 6D:
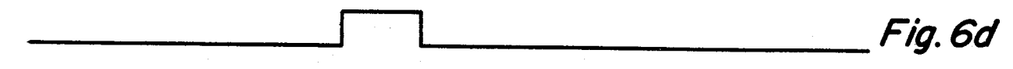
Figure 6E:
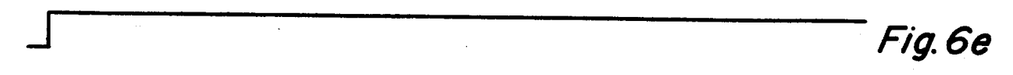
Figure 6F:
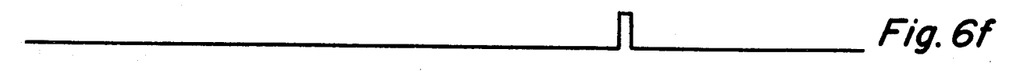
Figure 6G:
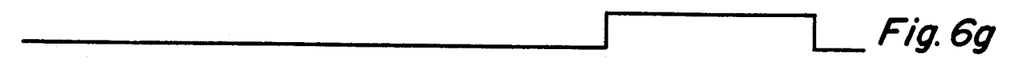
Figure 6H:
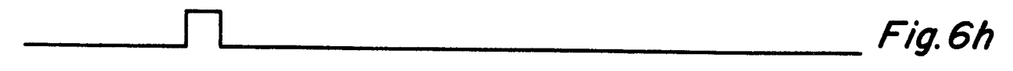
Figure 6I:
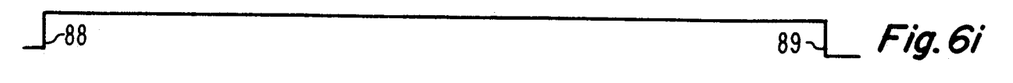

FIGS. 6a to 6i show the waveforms which are provided by the waveform generator 38 when the data are being serially transferred from the horizontal register 32 (FIG. 4) to the digital storage device 18 (FIG. 1). The pulse of FIG. 6a is used to maintain the output capacitor of the CCD at a fixed potential in the same manner as the pulses of FIG. 5b. The waveforms of FIG. 6b, 6c and 6d are the horizontal clocking waveforms used to clock the data from the horizontal register 32 to the digital memory 18. Thus, these pulses are applied to the input terminals 94, 95 and 96 of FIG. 4. The waveform of FIG. 6e is the vertical clocking waveform which locks vertical shifting while the data are being horizontally shifted from the register 32. The waveforms of FIGS. 6f, 6g and 6h, respectively, actuate the A/D 23, the sample and hold 22, and the correlated double sampler 21 (FIG. 1). In prior art systems, these waveforms are provided by special circuitry. The flexibility gained by using a digital memory for the waveform generator 32 in the inventive system eliminates the need for such circuitry. The waveform of FIG. 6i is start-stop waveform for horizontal data transfer. Thus the rise side 88 and the fall side 89 change the latch 57 to inform the control memory 36 of the start and stop of the horizontal data transfer. The time duration of this waveform can be changed to accommodate different CCDs.

The instant invention is highly advantageous because the CCD 11 of FIG. 1 can be removed and another CCD having a different number of pixels or requiring different transfer waveforms inserted into the system merely by setting the numbers of vertical columns and horizontal rows of pixels into the system by use of the select switches 41, 51 and 61 and/or by reprogramming the waveform generator 38.

What is claimed is:

1. In an inspection system including a charge coupled device (CCD) having pixels arranged in horizontal rows and vertical columns and a storage device for storing digital information transferred from said CCD; an improvement for transferring data from said CCD to said storage device comprising:

memory means for storing the number of horizontal rows of pixels and the number of vertical columns of pixels of said CCD;

first means for selectively setting said number of rows of pixels into said memory means;

second means for selectively setting said number of columns of pixels into said memory means; and waveform generator means responsive to said memory means for transferring data from said CCD to said storage device in accordance with the numbers of rows and columns set in said memory means whereby different sizes of CCDs can be used in said system by changing the settings on said first and second means for setting.

2. The inspection system of claim 1 wherein said first and second means for setting respectively include first and second counters for setting the number of horizontal rows and vertical columns into said memory means.

3. The inspection system of claim 2 wherein said first and second means for setting further include first and second select switches for respectively setting said first and second counters.

4. The inspection system of claim 3 further including an address counter responsive to said memory means for triggering said waveform generator.

5. The inspection system of claim 4 wherein said control memory simultaneously triggers said waveform generator means and one of said counters.

6. The inspection system of claim 1 or 5 wherein said waveform generator means is a programmable memory whereby the waveforms provided by said generator are changeable.

7. The inspection system of claim 6 wherein said waveform generator includes waveform select input terminals individually responsive to said memory means whereby said memory means selects vertical and horizontal data transfer modes.

8. The inspection system of claims 1 or 3 further including third means for setting a rapid vertical scan of a portion of said CCD whereby a portion of said CCD is used for data storage and the other portion of said CCD is used imaging.

9. A method of transferring analog data to a digital storage device from a charge coupled device (CCD) having X horizontal rows of pixels and Y vertical columns of pixels wherein X and Y can be changed when said CCD is changed comprising the steps of:
   setting said number of rows into a first counter and providing the output of said first counter to a control memory;
   setting said number of columns into a second counter and providing the output of said second counter to said control memory;
   coupling said control memory to a waveform generator to select horizontal and vertical data transfer modes to selectively make one horizontal or one vertical transfer of data in said CCD; and
   triggering said control memory with said waveform generator at the end of each data transfer to select another data transfer.

10. The method of claim 9 further including the step of simultaneously triggering one of said vertical or horizontal counters and said waveform generator through an address counter.

11. The method of claim 9 or 10 further including the step setting a fast vertical count whereby a portion of said CCD serves as a data storage device and the other portion of said CCD serves as an imaging device.

* * * * *